United States Patent
Mauerlechner et al.

(10) Patent No.: US 11,761,526 B2
(45) Date of Patent: Sep. 19, 2023

(54) GEAR RIM CARRIER PART FOR A TWO- OR MULTI-COMPONENT GEARWHEEL AND TWO-OR MULTI-COMPONENT GEARWHEEL HAVING SUCH A GEAR RIM CARRIER PART

(71) Applicant: IMS GEAR SE & Co. KGaA, Donaueschingen (DE)

(72) Inventors: Gregor Mauerlechner, Deisslingen (DE); Stefan Hoch, Lenzkirch (DE); Stefan Scherer, Bad Dürrheim (DE); Eugen Stoppel, Mühlingen (DE); Markus Bernhard, Nenzingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 16/803,513

(22) Filed: Feb. 27, 2020

(65) Prior Publication Data
US 2020/0278018 A1     Sep. 3, 2020

(30) Foreign Application Priority Data
Feb. 28, 2019   (EP) .................................. 19159881

(51) Int. Cl.
*F16H 55/17* (2006.01)
*F16H 55/06* (2006.01)

(52) U.S. Cl.
CPC ............. *F16H 55/17* (2013.01); *F16H 55/06* (2013.01); *F16H 2055/065* (2013.01); *F16H 2055/176* (2013.01)

(58) Field of Classification Search
CPC .......... F16H 2055/176; F16H 57/0025; F16H 55/06; F16H 55/12; F16H 2055/175; F16H 55/17; F16H 2055/065
(Continued)

(56) References Cited

U.S. PATENT DOCUMENTS 9,835,238 B2 * 12/2017 Oberle ................... F16H 55/17
2012/0227529 A1 * 9/2012 Fischer ................... F16H 55/06
74/434
(Continued)

FOREIGN PATENT DOCUMENTS

DE  10 2014 104284 A1  10/2015
DE  102014104284 A1 * 10/2015  ............. F16H 55/06
(Continued)

OTHER PUBLICATIONS

Search report from parallel pending EP application No. 19159881.2, dated Oct. 7, 2019.

*Primary Examiner* — Gregory Robert Weber
(74) *Attorney, Agent, or Firm* — Nath, Goldberg & Meyer; Jerald L. Meyer; Morgan D. Rosenberg

(57) ABSTRACT

A gear rim carrier part for a two- or multi-component gearwheel includes
an annular section which revolves around an axis of rotation in the circumferential direction,
a gear rim arranged radially on the outside of the annular section, and
a projection which extends radially inwards from the annular section and has a radially inner free end, or
the gear rim carrier part includes
an annular section which revolves around an axis of rotation in the circumferential direction,
a gear rim arranged radially on the inside of the annular section, and
a projection which extends radially outwards from the annular section and has a radially outer free end.
The projection has a first width at the radially inner free end thereof or at the radially outer free end thereof and has a second width at the opposite end thereof at the transition to the annular section.

16 Claims, 5 Drawing Sheets

(58) Field of Classification Search
USPC .......................................................... 74/446
See application file for complete search history.

(56) References Cited

U.S. PATENT DOCUMENTS

| | | | |
|---|---|---|---|
| 2013/0228028 A1* | 9/2013 | Kim .................... | B62D 5/0409 |
| | | | 74/434 |
| 2015/0308555 A1* | 10/2015 | Oberle ................... | F16H 55/17 |
| | | | 74/421 R |
| 2017/0095950 A1* | 4/2017 | Brochot ............. | B29C 45/1615 |
| 2017/0166239 A1* | 6/2017 | Kim ...................... | B62D 5/008 |
| 2019/0152347 A1* | 5/2019 | Becker ................. | F16H 57/032 |
| 2020/0191250 A1* | 6/2020 | Dewhirst ............... | F16H 55/17 |

FOREIGN PATENT DOCUMENTS

| | | | | |
|---|---|---|---|---|
| EP | 2 899 430 A1 | 7/2015 | | |
| GB | 2 064 708 A | 6/1981 | | |
| KR | 10-1346347 B1 * | 8/2013 | ....... | B29C 45/14311 |

* cited by examiner

GEAR RIM CARRIER PART FOR A TWO- OR MULTI-COMPONENT GEARWHEEL AND TWO-OR MULTI-COMPONENT GEARWHEEL HAVING SUCH A GEAR RIM CARRIER PART

The present invention relates to a gear rim carrier part for a two-component or multi-component gearwheel. The invention further relates to a two-component or multi-component gearwheel having such a gear rim carrier part.

Multi-component gearwheels are described, for example, in EP 2 899 430 A1 and are characterized in that they are composed of at least two different materials. For example, the gear rim carrier part which forms the gear rim can be made of a first material, while the remaining gearwheel consists of a second material. One of the advantages of this embodiment of two- or multi-component gearwheels is that the material can be chosen in a manner corresponding to the loads prevailing at the site of the gearwheel. The gear rim carrier part with the gear rim is subjected to a high degree of wear and/or large forces, whereas typically high torques and tilting moments, which have to be absorbed, act on the part which follows the gear rim carrier part and is connected thereto, hereinafter referred to as the connecting part. A two-component gearwheel can therefore consist, for example, of a first plastic and a second plastic, the first plastic being used for the gear rim carrier part and the second plastic being used for the connecting part. A particularly wear-resistant plastic can be chosen for the first plastic, while the second plastic can be a self-reinforcing plastic, which can also be fiber-reinforced.

In the case of three-component gearwheels, for example, the hub can be formed by an insert part, which can consist of metal.

In the case of two-component or multi-component gearwheels, it must be ensured that the gear rim carrier part and the connecting part do not slip against one another even at high torques. If the gearwheel has an insert part, it must also not slip relative to the connecting part. Therefore, US 2014/007724 A1, for example, discloses providing the gear rim carrier part and the insert part with protrusions and depressions with which the connecting part interacts in a form-fitting manner in the circumferential direction to counteract slipping.

Two or multi-component gearwheels are produced more and more often by injection molding, which is in particular the case if the two-component or multi-component gearwheels consist entirely or partially of plastic. In US 2014/007724 A1, two frequently used injection molding methods are shown—specifically, firstly, the diaphragm gate method and, secondly, the pin gate method. The gear rim carrier part can be injection-molded by means of these two methods. Because of the protrusions and depressions of the gear rim carrier part, the flow path of the material used, which is liquid during injection, is unfavorable when injected into the injection mold inasmuch as the material reaches some sites within the injection mold significantly later than adjacent sites. As a result, overflow channels form and the material cools later than at adjacent sites. The finished gear rim carrier part therefore has inhomogeneities, which consequently limit the maximum load-bearing capacity of gearwheels comprising gear rim carrier parts of this type.

An embodiment of the present invention addresses the problem of providing a gear rim carrier part which can be produced in such a way that it has lower inhomogeneities and can therefore be subjected to higher loads in comparison with known and comparable gear rim carrier parts. In addition, an embodiment of the present invention addresses the problem of providing a two-component or multi-component gearwheel which has a gear rim carrier part that can be subjected to higher loads.

This problem is solved by the features specified in claims 1 and 13. Advantageous embodiments are the subject matter of the dependent claims.

An embodiment of the invention relates to a gear rim carrier part for a two-component or multi-component gearwheel, wherein the gear rim carrier part comprises
an annular section which revolves around an axis of rotation in the circumferential direction,
a gear rim arranged radially on the outside of the annular section, and
a projection extending radially inwards from the annular section and having a radially inner free end, or
the gear rim carrier part comprises
an annular section which revolves around an axis of rotation in the circumferential direction,
a gear rim arranged radially on the inside of the annular section, and
a projection extending radially outwards from the annular section and having a radially outer free end,
the projection has a first width at its radially inner free end or at its radially outer free end and has a second width at its opposite end at the transition to the annular section,
the first width is smaller than the second width,
the projection broadens continuously or continuously in sections from the first width to the second width, and
a number of protrusions extending substantially along the longitudinal axis are arranged on the projection.

If there are two or more protrusions, they are arranged at a distance from one another. If there is only one protrusion, said protrusion is not circumferential since no form fit is provided between the gear rim carrier part and the connecting part in the circumferential direction.

The gear rim carrier part can be divided into the annular section and the projection, wherein these are materially cohesive. Therefore, this division is to be seen in a largely notional manner. The projection proceeds from the annular section and has a free end. At the free end, the projection has the first width, while the projection merges with the second width into the annular section. The first width and the second width relate to a plane extending through the axis of rotation. The projection broadens continuously or continuously in sections from the first width to the second width. "Continuously" is understood to mean that the projection has no section in which the width of the projection decreases, proceeding from the free end. "Continuously in sections" should be understood to mean that the projection also has sections in which the width of the projection remains the same. However, even in this case, the projection has no sections in which the width is reduced. In addition, "continuously" and "in sections" should be understood to mean that the width of the projection does not change abruptly. It should be noted at this point that these designs apply only to the width of the projection as such but not to the protrusions, which are to be regarded as being notionally separate from the projections, although they are materially cohesive with the projection.

Owing to the design of the projection according to the invention, a flow path is produced for the material, which is liquid during injection, which leads to significantly more uniform filling of the injection mold than in the case of gear rim carrier parts which are known, for example, from US 2014/007724 A1. Consequently, the formation of overflow channels is reduced and the homogeneity of the gear rim carrier part according to the invention is increased. The load-bearing capacity of the gear rim carrier part according to the invention is increased in relation to known comparable gear rim carrier parts.

According to a further embodiment, a number of first protrusions and a number of second protrusions are arranged on the projection, wherein the first protrusions proceed from a first axial surface of the projection and the second protrusions proceed from a second axial surface of the projection. As mentioned above, care must be taken in the case of two-component or multi-component gearwheels that the parts of the relevant gearwheel, for example the gear rim carrier part, do not slip during operation relative to the connecting part connected thereto. The protrusions provide a form fit in the circumferential direction with the connecting part so as to reduce the risk of slipping. The higher the number of protrusions, the lower the risk of slipping. In this embodiment, protrusions proceed from the projection in the two directions of the axis of rotation so as to increase the number of protrusions. In addition, in this embodiment, the projection can be configured symmetrically in the region of the protrusions with respect to a plane extending through the axis of rotation, wherein the plane of symmetry extends perpendicular to the axis of rotation. This also makes the flow path for the material uniform during injection so that the gear rim carrier part can be manufactured with increased homogeneity, which, as mentioned, is manifested in an increased load-bearing capacity. The protrusions are arranged at a distance from one another. The two axial surfaces are accessible between two protrusions.

In a further embodiment, the first protrusions and the second protrusions can be arranged in an offset manner with respect to one another in the circumferential direction. It is possible to avoid accumulations of material, which likewise leads to increased homogeneity of the gear rim carrier part.

In a further developed embodiment, a number of radially inner protrusions and a number of radially outer protrusions can proceed from the first axial surface and/or from the second axial surface. Proceeding from the free end towards the annular part, there are two protrusions arranged radially at a distance from one another, as a result of which the number of protrusions on the whole can be increased and the risk of the gear rim carrier part slipping relative to the connecting part can be reduced. It is also possible to provide more than two protrusions which are arranged radially at a distance from one another within a plane extending through the axis of rotation, as a result of which the number of protrusions can be further increased.

In a further embodiment, two or more extensions extending substantially along the longitudinal axis can be arranged within the protrusions. In principle, the greater the cross-sectional area of the protrusions, the greater the risk of the gear rim carrier part slipping relative to the connecting part. However, in the case of particularly large cross-sectional areas, overflow channels can form in turn within the protrusions, which should be avoided for the reasons mentioned. By means of the extensions within a protrusion, on the one hand, the formation of overflow channels can be reduced and, on the other hand, a large cross-sectional area can be achieved.

A further developed embodiment is characterized in that the protrusions have a trapezoidal cross section. It has been found that, when protrusions with a trapezoidal cross section are used, the gear rim carrier part can be produced with a high degree of homogeneity.

According to a further embodiment, the protrusions have an end face and/or a further end face which extends parallel to a plane extending perpendicular to the axis of rotation. The gear rim carrier part can be produced with a high degree of homogeneity in this embodiment as well.

A further embodiment is characterized in that
the first axial surface and/or the second axial surface form an axial surface angle with a plane extending perpendicular to the axis of rotation, and
the protrusions each have at least one end face which forms an end face angle with a plane extending perpendicular to the axis of rotation, and
the end face angle is greater than or equal to the axial surface angle.

The gear rim carrier part can be produced with a high degree of homogeneity in this embodiment as well.

According to a further developed embodiment, the protrusions have a further end face which
extends parallel to a plane extending perpendicular to the axis of rotation or
which forms a further end face angle with a plane extending perpendicular to the axis of rotation.

The gear rim carrier part can be produced with a high degree of homogeneity in this embodiment as well.

According to a further embodiment, the protrusions have an outer radial surface and an inner radial surface, wherein the outer radial surface and/or the inner radial surface extend parallel to the axis of rotation. As a result, the material can be introduced uniformly into the injection mold so as to achieve a high degree of homogeneity of the gear rim carrier part.

In a further developed embodiment, the protrusions merge with a curved transition surface into the projection. The use of curved transition surfaces likewise homogenizes the flow path, which in turn leads to a high degree of homogeneity of the gear rim carrier part.

According to a further developed embodiment, the axial surfaces, the end faces, the further end faces, the outer radial surfaces and/or the inner radial surfaces are curved. The curvatures allow the flow paths to be configured in a targeted manner in such a way that uniform filling of the injection mold is made possible, which in turn leads to increased homogeneity.

An embodiment of the invention relates to a two-component or multi-component gearwheel comprising
a gear rim carrier part according to one of the preceding claims, and
a connecting part which is connected in a form-fitting manner to the gear rim carrier part, wherein the connecting part surrounds the projection.

The technical effects and advantages which can be achieved with the two-component or multi-component gearwheel according to the invention correspond to those which have been discussed for the present gear rim carrier part. In summary, it should be noted that because of the design of the projection according to the invention for the material which is liquid during injection, a flow path is produced which leads to significantly more uniform filling of the injection mold than in the case of gear rim carrier parts known, for example, from US 2014/007724 A1. Consequently, the formation of overflow channels is reduced and the homogeneity of the gear rim carrier part according to the invention is increased. The load-bearing capacity of the two-component or multi-component gearwheel according to the invention is increased with respect to known, comparable two-component or multi-component gearwheels. These technical effects and advantages occur in particular when the gear rim carrier part is made of a first plastic and the connecting part is made of a second plastic. The first plastic can be a high-performance thermoplastic or a technical thermoplastic, whereas the second plastic can be a high-performance thermoplastic, a technical thermoplastic or a thermoset. It is possible to design the second plastic from which the connecting part is produced in a fiber-reinforced manner in order to achieve particularly high axial rigidity, which is desirable in particular in the case of helical toothing.

A further developed embodiment is characterized in that the two-component or multi-component gearwheel is designed as a spur gear, as a helical gear or as a worm gear, wherein the gear rim carrier part comprises
- an annular section which revolves around an axis of rotation in the circumferential direction,
- a gear rim arranged radially on the outside of the annular section, and
- a projection extending radially inwards from the annular section and having a radially inner free end.

In this embodiment, the two-component or multi-component gearwheel is designed as a spur gear which can be used in many applications, in particular in spur gear transmissions, which are widely used. However, the design of the two-component or multi-component gearwheel according to the invention is not limited to a spur gear. The two-component or multi-component gearwheel according to the invention can also be designed as a helical gear or worm wheel so that said gearwheel can be used in a helical gear transmission or a worm gear transmission. Helical gear transmissions and worm gear transmissions are used, for example, in electromechanical steering drives (EPS, "electric power steering").

According to a further developed embodiment, the two-component or multi-component gearwheel comprises an insert part which is connected to the connecting part and is surrounded by the connecting part. The insert part can be used to form a shaft-hub connection. While the gear rim carrier part and the connecting part, as mentioned, can be made of a first plastic or a second plastic, it is advisable to make the insert part of metal for forming a shaft-hub connection which can be subjected to high loads.

According to a further embodiment, the two-component or multi-component gearwheel is designed as a ring gear, wherein the gear rim carrier part comprises
- an annular section which revolves around an axis of rotation in the circumferential direction,
- a gear rim arranged radially on the inside of the annular section, and
- a projection extending radially outwards from the annular section and having a radially outer free end.

In this embodiment, the gearwheel can be used in particular in planetary transmissions.

Exemplary embodiments of the invention are explained in more detail in the following with reference to the attached drawings. The drawings show the following:

Figure 9:
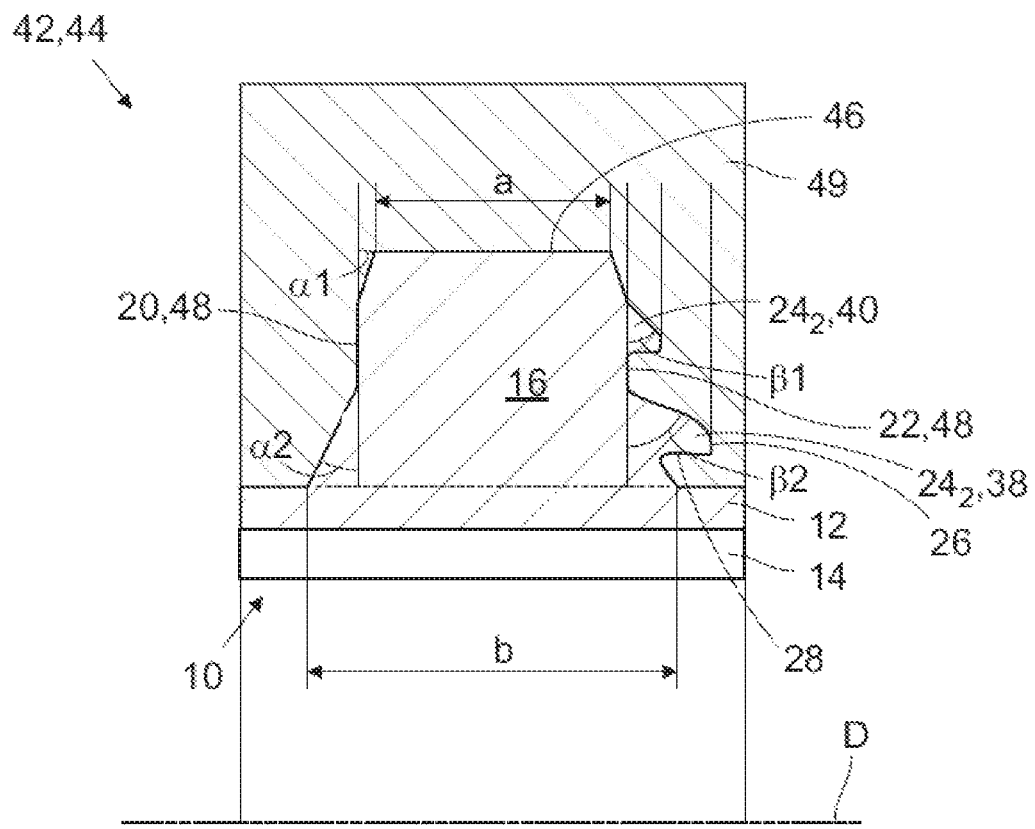
FIG. 9 shows a schematic sectional view of a two-component gearwheel according to the invention in the form of a ring gear.
Figure 10:
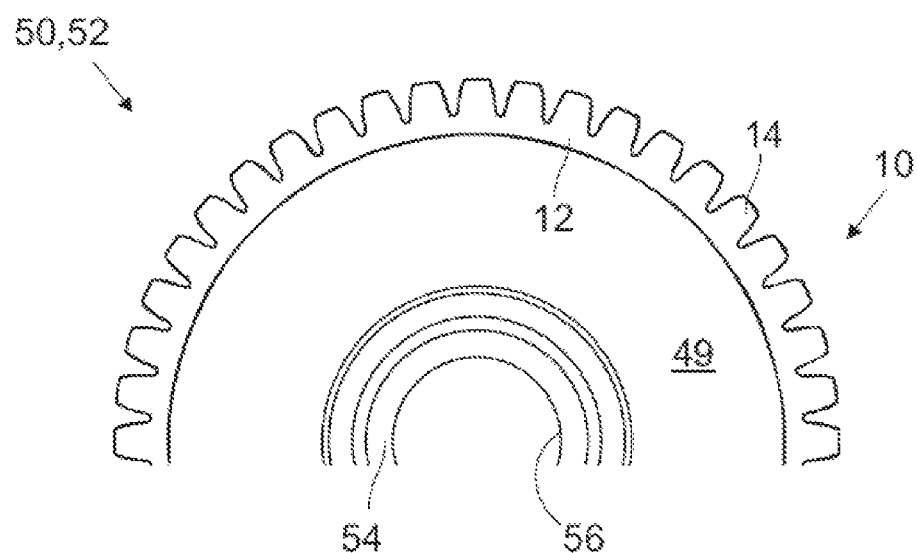
FIG. 10 shows a side view of a multi-component gearwheel according to the invention in the form of a spur gear.

FIGS. 1 to 8 show various exemplary embodiments of a gear rim carrier part 10 according to the invention, in sectional view in each case, which can be used for a two-component gearwheel 42 or a multi-component gearwheel 50 (see FIGS. 9 and 10). The two-component or multi-component gearwheel 42, 50 is arranged concentrically with respect to an axis of rotation D about which the two-component or multi-component gearwheel 42, 50 can rotate, depending on the design. The sectional plane of the sectional views of FIGS. 1 to 8 extends through the axis of rotation D. Only one half-section of the gear rim carrier part 10 is shown.

Figure 1:
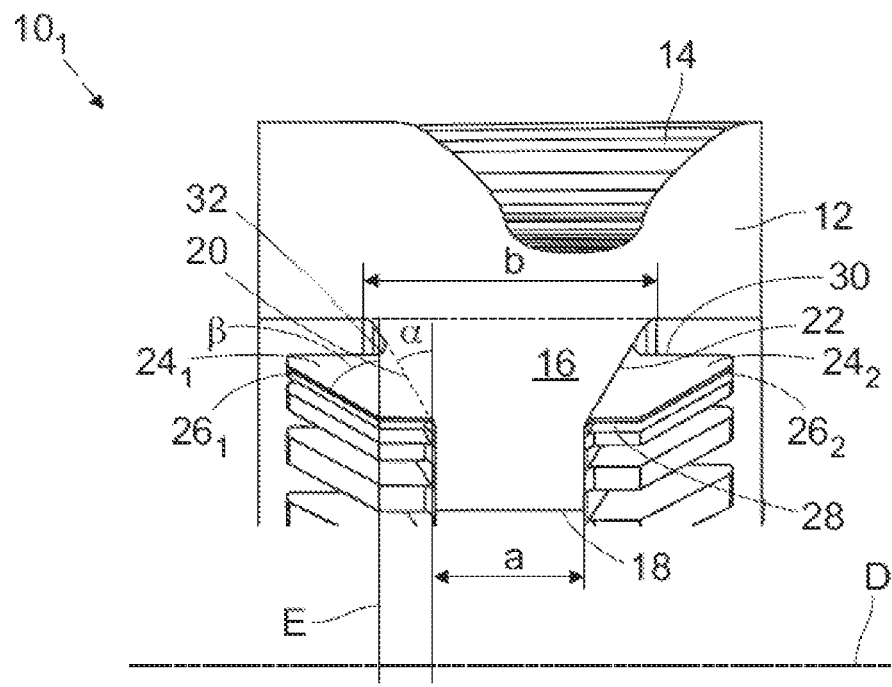
FIG. 1 shows a sectional view of a first exemplary embodiment of a gear rim carrier part according to the invention.

According to the first exemplary embodiment shown in FIG. 1, the gear rim carrier part $10_1$ according to the invention comprises an annular section 12 which extends annularly around the axis of rotation D in the circumferential direction. Radially on the outside, the annular section 12 forms a gear rim 14 with which the gear rim carrier part 10 or the two-component or multi-component gearwheel 42, 50 provided with the gear rim carrier part 10 can be brought into meshing engagement with a gearwheel (not shown here). Depending on the design, the two-component or multi-component gearwheel 42, 50 can be designed as a spur gear, a helical gear or worm gear and can be brought into engagement with a correspondingly designed gearwheel.

The gear rim carrier part $10_1$ according to the invention furthermore has a projection 16 which, proceeding from the annular section 12, extends radially inwards towards the axis of rotation D and forms a radially inner free end 18. The projection 16 has a first width a at the radially inner free end 18, which extends parallel to the axis of rotation D. The projection 16 has a second width b at the transition to the annular section 12, which extends parallel to the axis of rotation D. Proceeding from the radially inner free end 18, the projection 16 broadens continuously from the first width a to the second width b. In the first exemplary embodiment of the gear rim carrier part $10_1$, the width increases uniformly, so the projection 16 has a funnel shape.

The projection 16 has a first axial surface 20 and a second axial surface 22, each of which forms an axial surface angle α of the same size with a plane E extending perpendicular to the axis of rotation D. A number of protrusions 24 proceed from the first axial surface 20 and the second axial surface 22—first protrusions $24_1$ proceeding from the first axial surface 20 and second protrusions $24_2$ proceeding from the second axial surface 22 in the first exemplary embodiment. The first protrusions $24_1$ and the second protrusions $24_2$ have the same dimensions but have different directions with respect to the axis of rotation D. In addition, the first protrusions $24_1$ and the second protrusions $24_2$ are each arranged at a distance from one another in the circumferential direction so that there is a gap between two adjacent protrusions $24_1$, $24_2$. In addition, the first protrusions $24_1$ and the second protrusions $24_2$ are arranged offset relative to one another in the circumferential direction.

The protrusions $24_1$, $24_2$ are substantially trapezoidal and each comprise an end face 26, here a first end face $26_1$ and a second end face $26_2$, an inner radial surface 28 and an outer radial surface 30. The inner radial surface 28 and the outer radial surface 30 extend parallel to one another and parallel to the axis of rotation D, while the end face 26 forms an end face angle β with a plane E extending perpendicular to the axis of rotation D. In the first exemplary embodiment, the end face angle β is greater than the axial surface angle α.

The protrusions 24 merge radially on the outside with a curved transition surface 32 into the projection 16.

Figure 2:
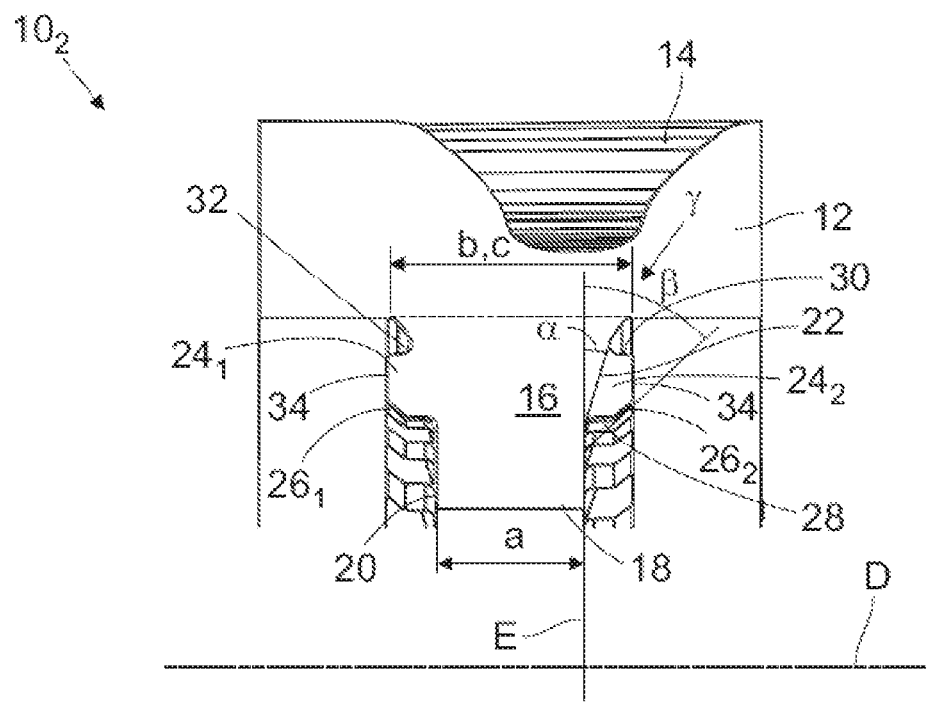
FIG. 2 shows a sectional view of a second exemplary embodiment of a gear rim carrier part according to the invention.

In the second exemplary embodiment of the gear rim carrier part $10_2$, which is illustrated in FIG. 2, the protrusions 24 each have a further end face 34 which forms a further end face angle γ with a plane E extending perpendicular to the axis of rotation D. In the second exemplary embodiment, the further end face 34 extends parallel to the plane E extending perpendicular to the axis of rotation D, while the further end face angle γ is equal to zero. However, it can just as easily deviate from zero and be less or greater than the axial surface angle α. In addition, the further end face angle γ can also be less or greater than the end face angle β.

The two further end faces 34 of the first protrusions $24_1$ and of the second protrusions $24_2$ have a distance c, which in the second exemplary embodiment is equal to the second width b.

Figure 3:
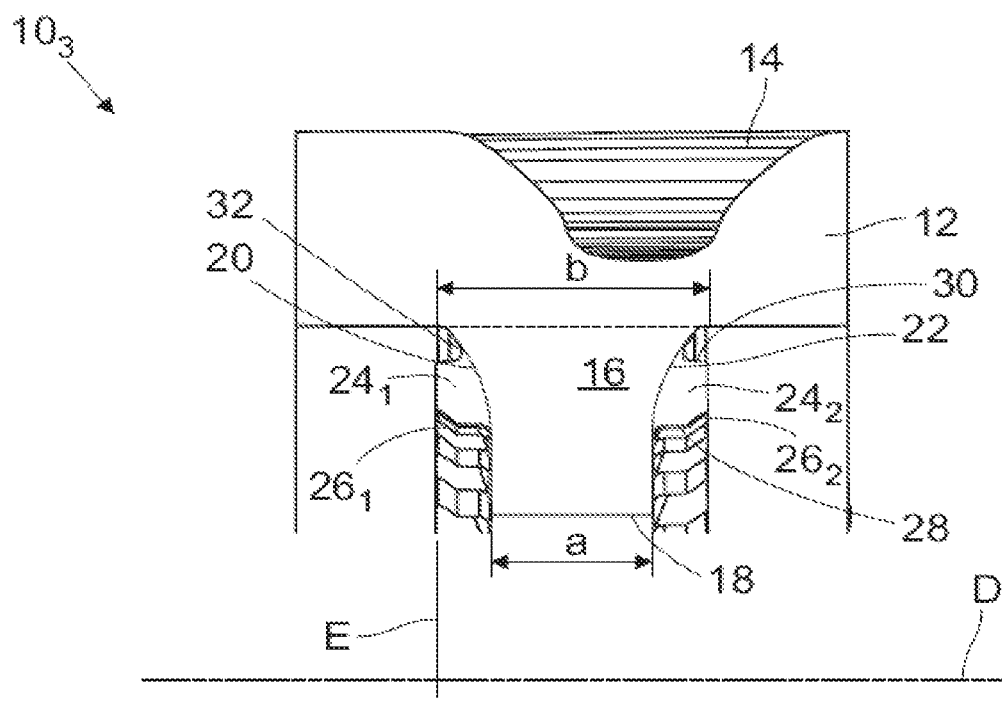
FIG. 3 shows a sectional view of a third exemplary embodiment of a gear rim carrier part according to the invention.

The third embodiment of the gear rim carrier part $10_3$ shown in FIG. 3 is largely similar to the second exemplary embodiment of the gear rim carrier part $10_2$, but the first axial surface 20 and the second axial surface 22 are curved, so no clear axial surface angle α can be defined.

Figure 4:
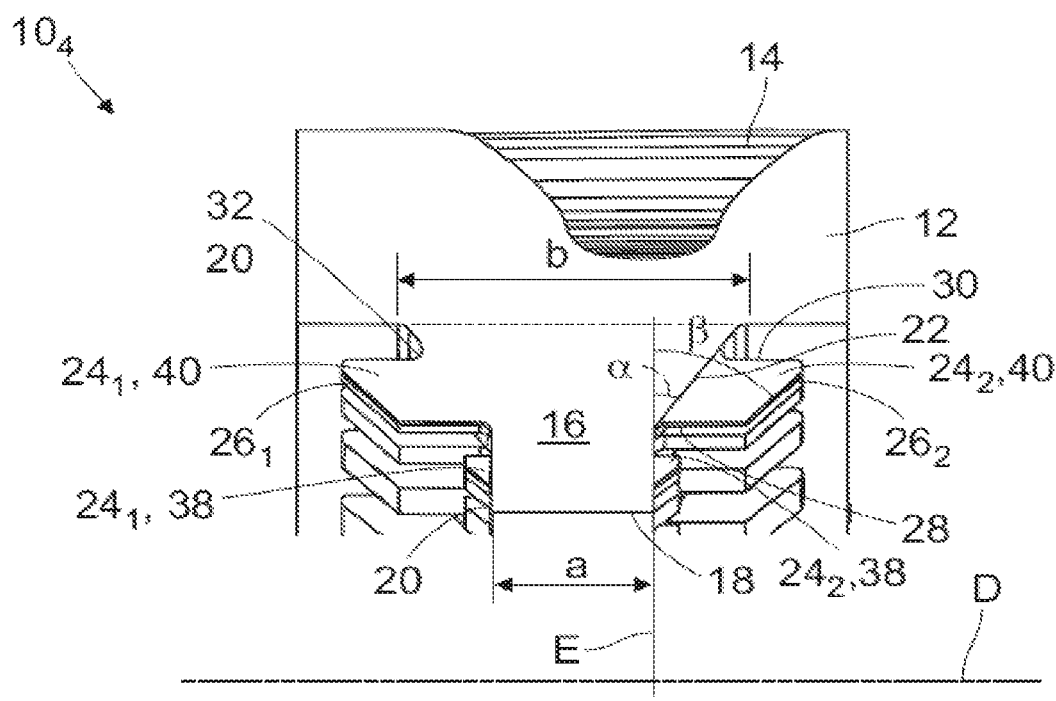
FIG. 4 shows a sectional view of a fourth exemplary embodiment of a gear rim carrier part according to the invention.

The fourth exemplary embodiment of the gear rim carrier part $10_4$ shown in FIG. 4 is largely identical to the first exemplary embodiment of the gear rim carrier part $10_1$, the end face angle β being almost equal to the axial surface angle α. Therefore, in the fourth exemplary embodiment, the protrusions 24 are approximately parallelogram-shaped.

Figure 5:
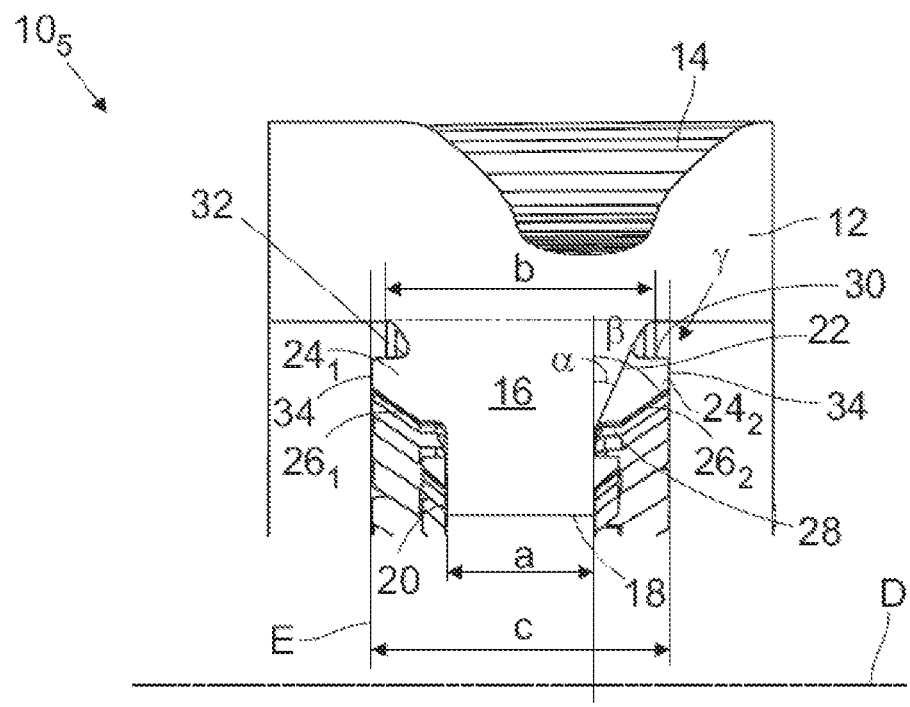
FIG. 5 shows a sectional view of a fifth exemplary embodiment of a gear rim carrier part according to the invention.
Figure 6:
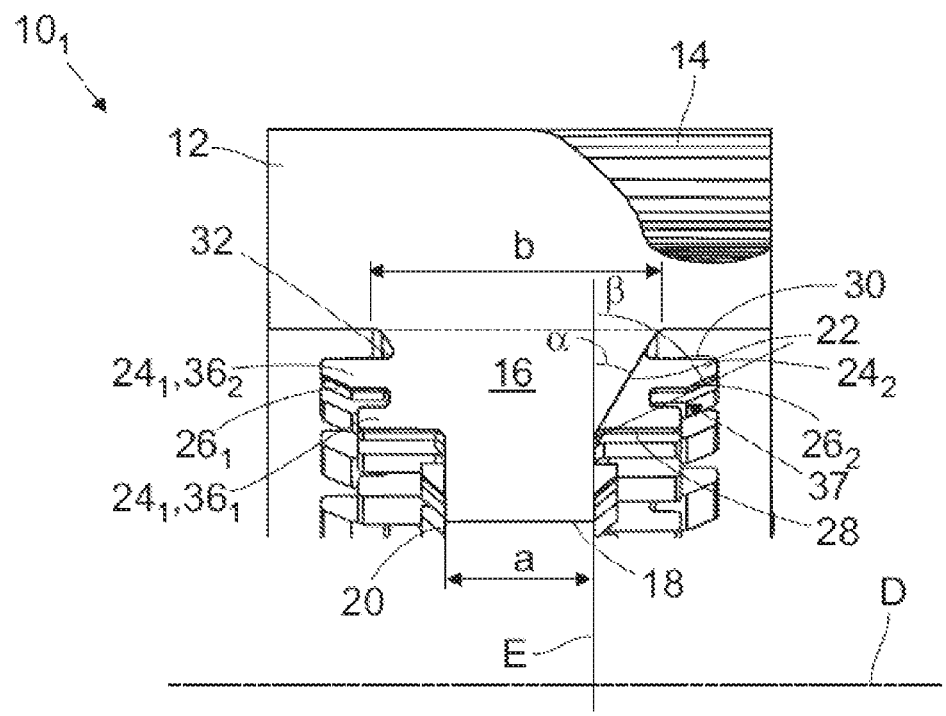
FIG. 6 shows a sectional view of a sixth exemplary embodiment of a gear rim carrier part according to the invention.
Figure 7:
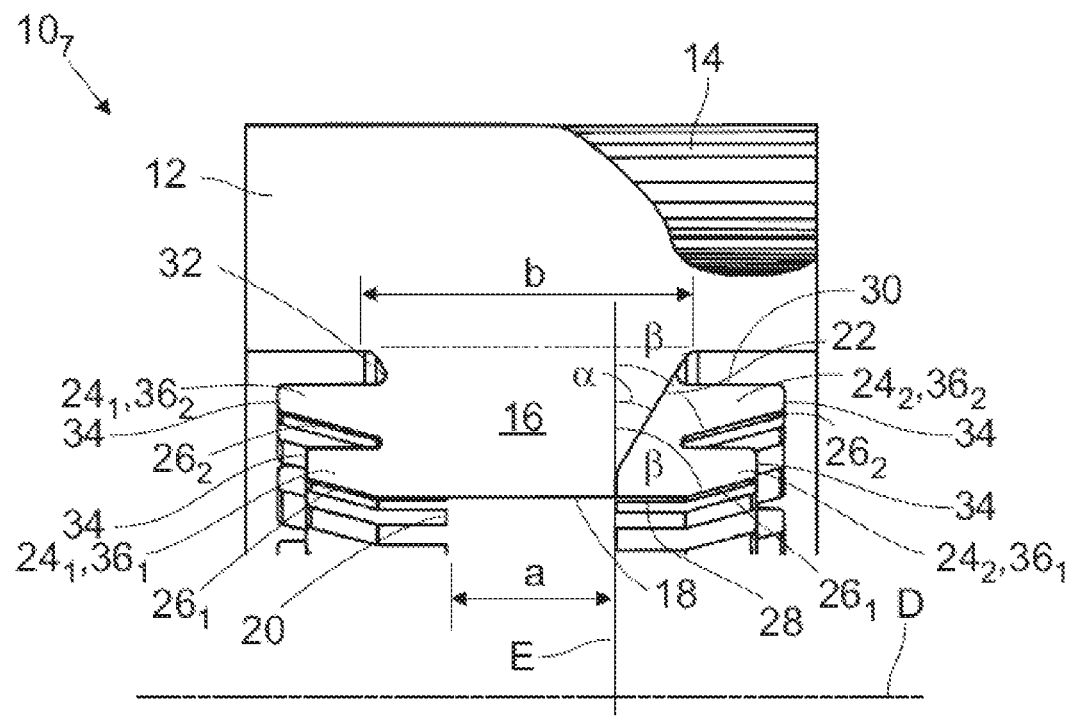
FIG. 7 shows a sectional view of a seventh exemplary embodiment of a gear rim carrier part according to the invention.
Figure 8:
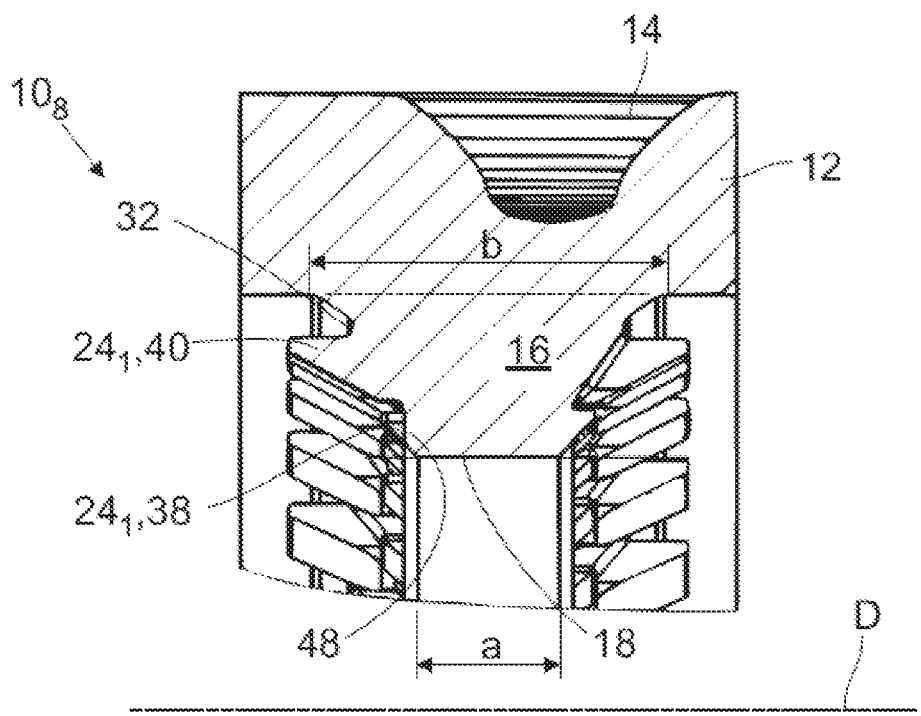
FIG. 8 shows a sectional view of an eighth exemplary embodiment of a gear rim carrier part according to the invention.

The fifth exemplary embodiment of the gear rim carrier part $10_5$ illustrated in FIG. 5 is largely identical to the second embodiment of the gear rim carrier part $10_2$, but the distance c between the two further end faces 34 is greater than the second width b.

The protrusions 24 of the gear rim carrier part $10_6$ according to the sixth exemplary embodiment have a first extension $36_1$ and a second extension $36_2$ which extend substantially along the axis of rotation D. The end face 26 of the first extension $36_1$ is curved, whereas the end face 26 of the second extension $36_2$ has an end face angle β which is greater than the axial surface angle α. The further end face 34 is likewise curved. The inner radial surface 28 and the outer radial surface 30 extend parallel to one another and parallel to the axis of rotation D. The extensions $36_1$, $36_2$ are separated from one another by a depression 37, but the depression 37 does not reach as far as the axial surfaces 20, 22.

The protrusions 24 of the gear rim carrier part $10_7$ according to the seventh exemplary embodiment also have the first extension $36_1$ and the second extension $36_2$, but the first extension $36_1$ has a first end face $26_1$ and the second extension $36_2$ has a second end face $26_2$, which run parallel to one another.

In the eighth exemplary embodiment, the gear rim carrier part $10_8$ has a radially inner protrusion 38 and a radially outer protrusion 40. The radially inner protrusion 38 is arranged on a section 48 of the projection 16 in which the width of the projection 16 does not change.

FIG. 9 shows an exemplary embodiment of a two-component gearwheel 42 which is designed as a ring gear 44. The gear rim 14 of the gear rim carrier part 10 is therefore arranged radially on the inside of the annular section 12, while the projection 16 extends radially outwards from the annular section 12 and has a radially outer free end 46. A connecting part 49 is connected to the gear rim carrier part 10 in that it is injection-molded around the projection 16.

The gear rim carrier part 10 has the already mentioned section 48 in which the width of the projection 16 does not change. A radially outer protrusion 40 is arranged in said section 48. A radially inner protrusion 38 has a curved end face 26 and a curved inner radial surface 28.

FIG. 10 shows a side view of a multi-component gearwheel 50 (in this case a three-component gearwheel 50) in the form of a spur gear 52. An embodiment of the multi-component gearwheel 50 as a helical gear or worm gear (not shown) is also conceivable. The three-component gearwheel 50 comprises a gear rim carrier part 10 according to one of the exemplary embodiments discussed above, on the annular section 12 of which a gear rim 14 is arranged radially on the outside. In this case, the connecting part 49 is arranged radially inwards from the gear rim carrier part 10 and is connected thereto. Furthermore, the three-component gearwheel 50 comprises an insert part 54 which is arranged radially inwards from the connecting part 49 and is connected thereto. The insert part 54 forms a hub 56 with which the spur gear 52 can be connected to a shaft (not shown here).

LIST OF REFERENCE SIGNS

10 Gear rim carrier part
$10_1$-$10_8$ Gear rim carrier part
12 Annular section
14 Gear rim
16 Projection
18 Inner free end
20 First axial surface
22 Second axial surface
24 Protrusions
$24_1$ First protrusions
$24_2$ Second protrusions
26 End face
$26_1$ First end face
$26_2$ Second end face
28 Inner radial surface
30 Outer radial surface
32 Curved transition surface
34 Further end face
36 Extension
$36_1$ First extension
$36_2$ Second extension
37 Depression
38 Radially inner protrusion
40 Radially outer protrusion
42 Two-component gearwheel
44 Ring gear
46 Radially outer free end
48 Section
49 Connecting part
50 Multi-component gearwheel 52 Spur gear
54 Insert part
56 Hub
D Axis of rotation
α Axial surface angle
β End face angle
γ Further end face angle

What is claimed is:

1. A gear rim carrier part (10) for a two-component or multi-component gearwheel (46, 50), wherein
the gear rim carrier part (10) comprises:
an annular section (12) which revolves around an axis of rotation (D) in the circumferential direction,
a gear rim (14) arranged radially on the outside of the annular section (12), and
a projection (16) which extends radially inwards from the annular section (12) and has a radially inner free end (18),
the projection (16) has a first width (a) at the radially inner free end (18) thereof and has a second width (b) at an opposite end thereof at a transition to the annular section (12), the projection (16) further having a first axial surface (20) and a second axial surface (22),
wherein the first width (a) is smaller than the second width (b),
wherein a width of the projection (16) broadens in a broadening region continuously between the first axial surface (20) and the second axial surface (22), the broadening region being between the first width (a) and the second width (b),
wherein a number of protrusions (24) extending outwardly from the projection (16) along the axis of rotation (D) are arranged on the projection (16), the number of protrusions (24) comprising a first set of protrusions ($24_1$) extending from the first axial surface (20) and a second set of protrusions ($24_2$) extending from the second axial surface (22), and
wherein the number of protrusions (24) merge with a curved transition surface (32) into the projection (16) in the broadening region.

2. The gear rim carrier part (10) according to claim 1, wherein the first set of protrusions ($24_1$) and the second set of protrusions ($24_2$) are arranged offset relative to one another in the circumferential direction.

3. The gear rim carrier part (10) according to claim 1, characterized in that a number of radially inner protrusions (38) and a number of radially outer protrusions (40) proceed from the first axial surface (20) and/or from the second axial surface (22).

4. The gear rim carrier part (10) according to claim 1, characterized in that two or more extensions (36) extending substantially along the axis of rotation (D) are arranged within the protrusions (24).

5. The gear rim carrier part (10) according to claim 1, wherein each of the protrusions (24) has a trapezoidal cross section.

6. The gear rim carrier part (10) according to claim 1, characterized in that the protrusions (24) have an end face (26) and/or a further end face (34) which extends parallel to a plane (E) extending perpendicular to the axis of rotation (D).

7. The gear rim carrier part (10) according to claim 1, wherein
the first axial surface (20) and/or the second axial surface (22) form an axial surface angle (α) with a plane (E) extending perpendicular to the axis of rotation (D), and the protrusions (24) each have at least one end face (26) which forms an end face angle (β) with a plane (E) extending perpendicular to the axis of rotation (D), and
the end face angle (β) is greater than or equal to the axial surface angle (α).

8. The gear rim carrier part (10) according to claim 7, characterized in that the protrusions (24) have a further end face (34) which
extends parallel to a plane (E) extending perpendicular to the axis of rotation (D) or
which forms a further end face angle (γ) with a plane (E) extending perpendicular to the axis of rotation (D).

9. The gear rim carrier part (10) according to claim 1, wherein the protrusions (24) have an outer radial surface (30) and an inner radial surface (28), wherein the outer radial surface (30) and/or the inner radial surface (28) extend parallel to the axis of rotation (D).

10. The gear rim carrier part (10) according to claim 1, characterized in that the axial surfaces (20, 22), the end faces (26), the further end faces (34), the outer radial surfaces (30) and/or the inner radial surfaces (28) are curved.

11. A two- or multi-component gearwheel (42, 50), comprising:
a gear rim carrier part (10) according to claim 1, and
a connecting part (49) which is connected in a form-fitting manner to the gear rim carrier part (10), wherein the connecting part (49) surrounds the projection (16).

12. The two- or multi-component gearwheel (42, 50) according to claim 11,
wherein the two-component or multi-component gearwheel (42, 50) is designed as a spur gear (52).

13. The two- or multi-component gearwheel (42, 50) according to claim 11,
wherein the two- or multi-component gearwheel (42, 50) comprises an insert part (54) which is connected to the connecting part (49) and is surrounded by the connecting part (49).

14. A gear rim carrier part (10) for a two-component or multi-component gearwheel (46, 50), wherein
the gear rim carrier part (10) comprises:
an annular section (12) which revolves around an axis of rotation (D) in the circumferential direction,
a gear rim (14) arranged radially on the inside of the annular section (12), and
a projection (16) which extends radially outwards from the annular section (12) and has a radially outer free end (46),
wherein the projection (16) has a first width (a) at the radially outer free end (46) and has a second width (b) at an opposite end thereof at a transition to the annular section (12), the projection (16) further having a first axial surface (20) and a second axial surface (22),
wherein the first width (a) is smaller than the second width (b),
wherein a width of the projection (16) broadens in a broadening region continuously between the first axial surface (20) and the second axial surface (22), the broadening region being between the first width (a) and the second width (b),
wherein a number of protrusions (24) extending outwardly from the projection (16) along the axis of rotation (D) are arranged on the projection (16), the number of protrusions (24) comprising a first set of protrusions ($24_1$) extending from the first axial surface (20) and a second set of protrusions ($24_2$) extending from the second axial surface (22), and wherein the number of protrusions (24) merge with a curved transition surface (32) into the projection (16) in the broadening region.

15. A two- or multi-component gearwheel (42, 50), comprising:
a gear rim carrier part (10) according to claim 14, and
a connecting part (49) which is connected in a form-fitting manner to the gear rim carrier part (10), wherein the connecting part (49) surrounds the projection (16).

16. The two- or multi-component gearwheel (42, 50) according to claim 15,
wherein the two-component or multi-component gearwheel (42, 50) is designed as a ring gear (44).

* * * * *